(12) United States Patent
Decker (10) Patent No.: US 7,694,731 B2
(45) Date of Patent: Apr. 13, 2010

(54) TRUCK-MOUNTED PUMPING SYSTEM FOR TREATING A SUBTERRANEAN FORMATION VIA A WELL WITH A MIXTURE OF LIQUIDS

(75) Inventor: Randal L. Decker, Midland, TX (US)

(73) Assignee: Team $CO_2$, Inc., Midland, TX (US)

( * ) Notice: Subject to any disclaimer, the term of this patent is extended or adjusted under 35 U.S.C. 154(b) by 0 days.

(21) Appl. No.: 12/381,204

(22) Filed: Mar. 9, 2009

(65) Prior Publication Data

US 2009/0200011 A1 Aug. 13, 2009

(51) Int. Cl.
E21B 43/25 (2006.01)
E21B 43/27 (2006.01)

(52) U.S. Cl. ............... 166/90.1; 166/75.11; 166/177.5; 166/305.1; 166/307

(58) Field of Classification Search ........................ None
See application file for complete search history.

(56) References Cited

U.S. PATENT DOCUMENTS

| | | | |
|---|---|---|---|
| 3,193,014 A | | 7/1965 | Armistead |
| 3,195,634 A | * | 7/1965 | Armistead ................. 166/302 |
| 3,298,438 A | * | 1/1967 | Fields et al. ................ 166/302 |
| 3,396,107 A | * | 8/1968 | Armistead ................. 507/202 |
| 3,664,422 A | * | 5/1972 | Bullen ....................... 166/283 |
| 3,722,595 A | * | 3/1973 | Kiel ........................ 166/308.4 |
| 3,842,910 A | | 10/1974 | Zingg et al |
| 3,970,148 A | | 7/1976 | Jones et al. |
| 4,212,354 A | | 7/1980 | Guinn |
| 4,235,289 A | | 11/1980 | Weeter |
| 4,374,545 A | | 2/1983 | Bullen et al. |
| 4,593,763 A | | 6/1986 | Burke |
| 4,650,000 A | | 3/1987 | Andreasson et al. |
| 4,737,296 A | | 4/1988 | Watkins |
| 5,002,125 A | | 3/1991 | Phillips et al. |
| 5,049,743 A | * | 9/1991 | Taylor et al. ............... 250/303 |
| 5,105,843 A | | 4/1992 | Condron et al. |
| 5,312,862 A | | 5/1994 | Nielsen et al. |
| 5,656,136 A | * | 8/1997 | Gayaut et al. .............. 166/302 |
| 6,555,505 B1 | | 4/2003 | King et al. |
| 6,988,552 B2 | | 1/2006 | Wilson et al. |
| 2005/0000685 A1 | * | 1/2005 | Pham et al. ................ 166/90.1 |
| 2006/0107978 A1 | * | 5/2006 | Saik ....................... 134/166 R |
| 2006/0289166 A1 | * | 12/2006 | Stromquist et al. ....... 166/305.1 |
| 2007/0204991 A1 | * | 9/2007 | Loree et al. .............. 166/280.1 |
| 2009/0050311 A1 | * | 2/2009 | Crawford ................... 166/90.1 |

* cited by examiner

*Primary Examiner*—George Suchfield
(74) *Attorney, Agent, or Firm*—F. Lindsey Scott

(57) ABSTRACT

An efficient truck-mounted injection system for injecting a combined aqueous or hydrocarbon-based liquid stream and a liquid carbon dioxide stream via a well into a subterranean formation.

17 Claims, 8 Drawing Sheets

TRUCK-MOUNTED PUMPING SYSTEM FOR TREATING A SUBTERRANEAN FORMATION VIA A WELL WITH A MIXTURE OF LIQUIDS

FIELD OF THE INVENTION

The present invention relates to an efficient truck-mounted injection system for injecting an aqueous or hydrocarbon-based liquid stream or a mixed aqueous and hydrocarbon-based liquid stream and a liquid carbon dioxide stream via a well into a subterranean formation.

BACKGROUND OF THE INVENTION

In the use of liquid carbon dioxide for injection with various liquid well treating materials, it has been necessary in the past to use two high-pressure pumps; one for the injection of an aqueous or hydrocarbon-based liquid stream and one for the liquid carbon dioxide stream to achieve the required injection and mixing pressures.

These high-pressure pumps, which are large pumps, are typically mounted on heavy duty trucks for movement to a well area. These pumps are typically massive, positive displacement pumps having one or multiple plungers and are used to increase the pressure of injection streams to a pressure suitable for injection into a well up to and at or exceeding fracturing conditions as required. The use of these pumps is expensive since they are subject to a substantial per diem charge as a result of the high cost of the pumps, because such pumps have relatively high maintenance costs and are typically transported separately on trucks which also incur a substantial per diem charge.

A more efficient and economical way to inject a stream of liquid carbon dioxide and a liquid stream of aqueous or hydrocarbon-based liquid treating solution into a well at a suitable pressure has been sought.

SUMMARY OF THE INVENTION

A truck-mounted system for injecting a mixture of liquids into a subterranean formation via a well extending from an earth surface into the subterranean formation, the system comprising: a truck having a bed and being adapted to support the system and transport the system for use to inject the mixture of liquids via the well into the subterranean formation; a first tank positioned on the bed, adapted to contain a quantity of a first liquid and adapted to supply selected quantities of the first liquid to the well; a second tank positioned on the bed, adapted to contain a quantity of a second liquid and adapted to supply selected quantities of the second liquid to the well; a first pump supported by the bed in fluid communication with the first tank and adapted to pump selected quantities of the first liquid to a first selected intermediate pressure; a second pump supported by the bed in fluid communication with the second tank and adapted to pump selected quantities of the second liquid to a second selected intermediate pressure; and, a third pump supported by the truck bed, in fluid communication with the first pump and the second pump and adapted to pump the liquid mixture into the well at a pressure higher than the first and second selected intermediate pressure.

DESCRIPTION OF PREFERRED EMBODIMENTS

In the discussion of the Figures and embodiments, various features such as pumps, valves and the like necessary to achieve the flows required and discussed are shown schematically for simplicity since such features are considered to be well known to those skilled in the art.

In the description of the present invention, detailed descriptions of the equipment used are not included since they are not necessary to the description of the present invention and include well-known equipment.

Figure 1:
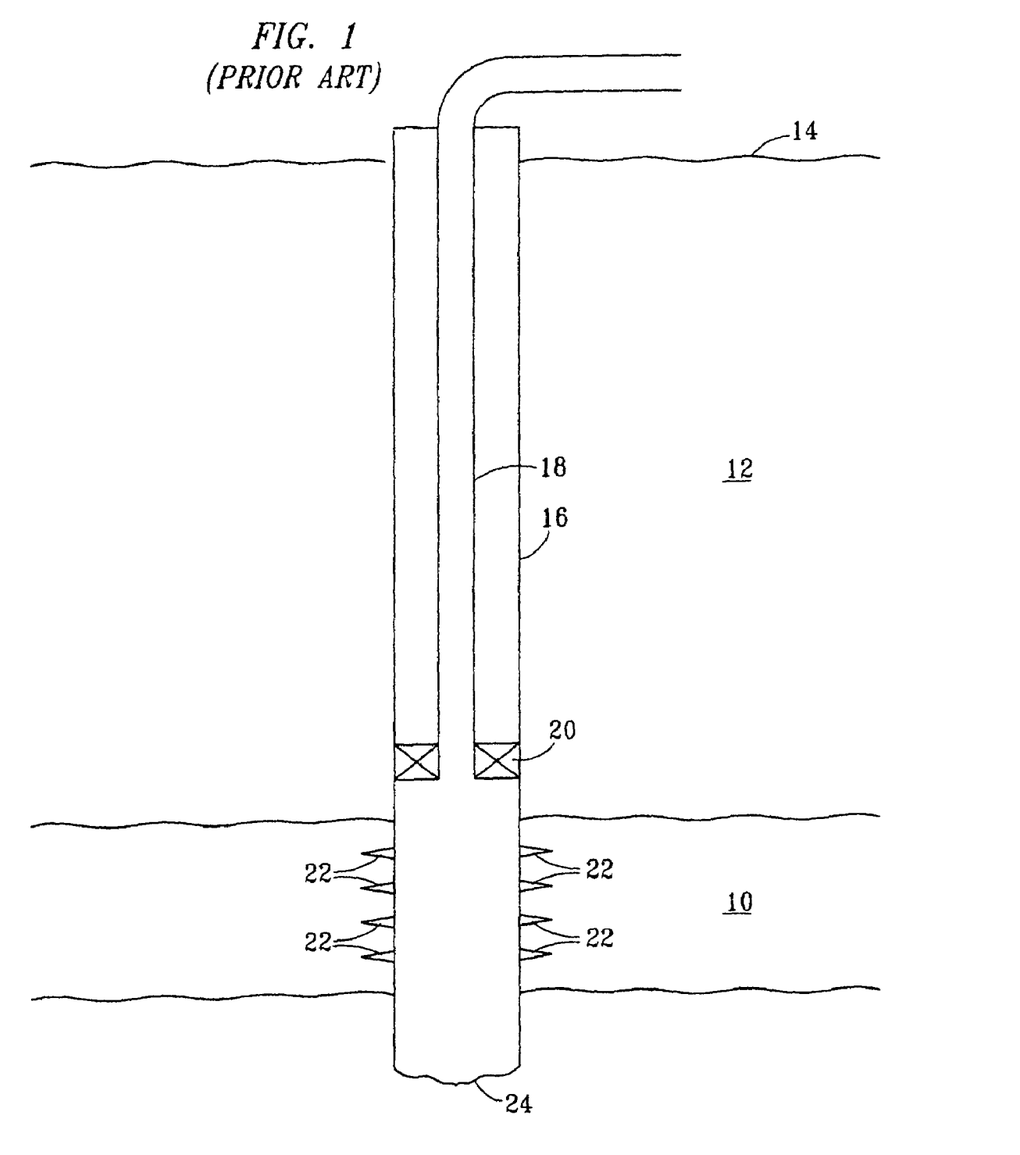
FIG. 1 is a schematic diagram of a prior art system for injecting a mixture of a treating solution and liquid carbon dioxide.

In FIG. 1 a subterranean formation 10, which is to be treated is shown. Subterranean formation 10 underlies an overburden 12 and an earth surface 14. Subterranean formation 10 is penetrated by a well 16, which includes tubing 18 and a packer 20 to enable the injection of a treating liquid into subterranean formation 10. Well 16, while not described in detail, is a cased well and includes perforations 22, extending from an inside of the well into subterranean formation 10. A bottom 24 of the well may be in or directly beneath subterranean formation 10 or well 16 may extend into subterranean formations lying beneath subterranean formation 10. If so, it is desired that subterranean formation 10 be isolated, as well known to those skilled in the art, for treatment.

Figure 2:
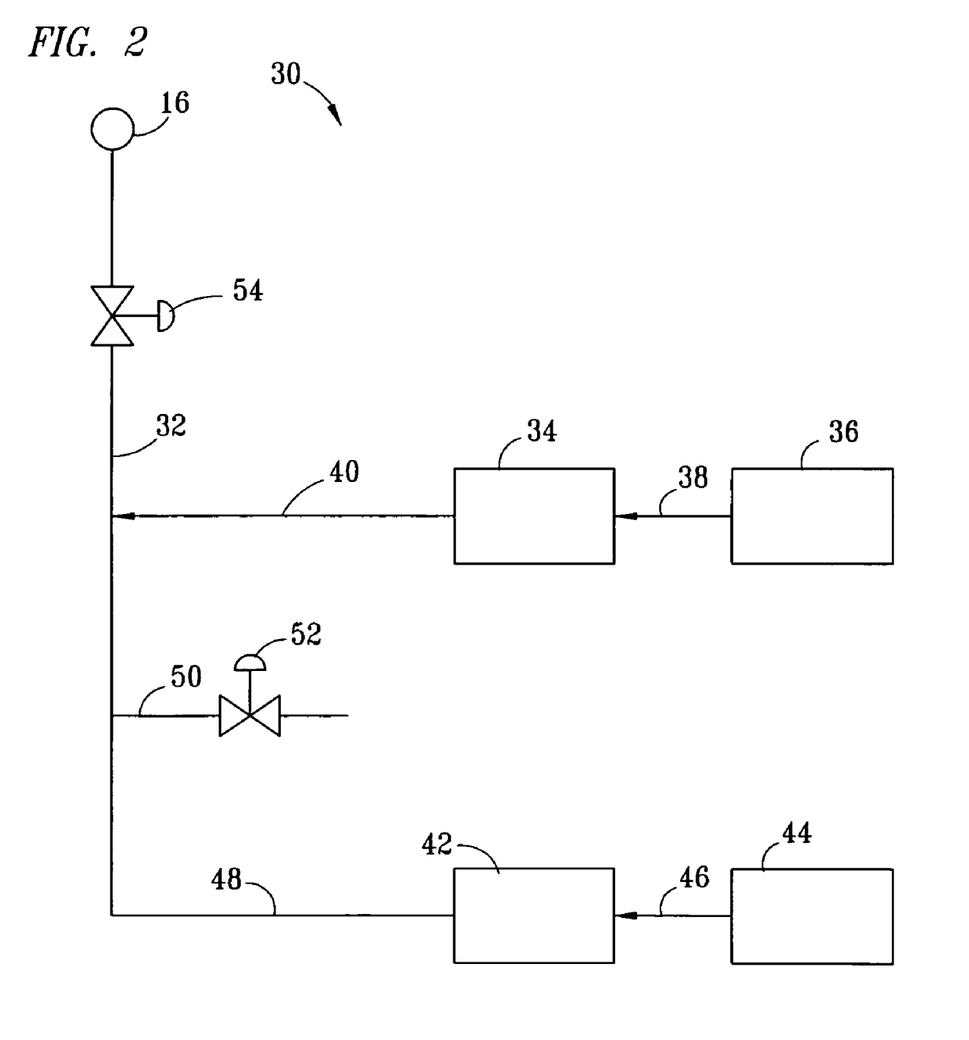
FIG. 2 is a schematic diagram of a system for supplying a composition of the treating solution and liquid carbon dioxide to a well.

In FIG. 2 a system 30 is shown for producing the composition for injection into well 16. The system comprises a line 32, which is in fluid communication with a system for mixing the components via line 32 and a check valve 54 and a well 16. An acid pump 34 is shown in communication via a line 38 with an acid supply 36 to supply aqueous acid via a line 40 at a desired pressure and rate to line 32. Similarly, a liquid $CO_2$ pump 42 is shown in communication with a liquid $CO_2$ supply 44 via a line 46 so that liquid $CO_2$ is desirably pumped via a line 48 into line 32. Line 32 includes a line 50 and a pressure valve 52 for the relief of pressure if desired. It will be understood that the aqueous acid supply and the liquid $CO_2$ supply could be originally provided at pressure so that it would be unnecessary to have pumps for either or both. Such variations are considered to be well within the scope of the present invention.

According to the present invention, the treating fluid is mixed with liquid $CO_2$ to produce an injection liquid containing from about 51 to about 95 weight percent liquid $CO_2$. Preferably, the liquid $CO_2$ is present in a weight percentage from about 60 to about 80. The resulting injection liquid is injected into the subterranean formation, which is then shut in for at least one hour.

The treating fluid may be any well-treating material such as an acid, a corrosion inhibitor, a solvent or a scale inhibitor. The acid may be any suitable inorganic or organic acid, such as acids selected from the group consisting of hydrochloric, perchloric, nitric, sulfuric, phosphoric, hydrobromic, hydrofluoric, hydriodic, citric, acetic and the like. Substantially any suitable acid can be used, so long as it is compatible with the subterranean formation and effective to dissolve small portions of the formation or otherwise treat the formation as desired. The acid is mixed with liquid $CO_2$ in an amount from about 51 to about 95 weight percent to produce a composition comprising about 51 to about 95 weight percent liquid $CO_2$ and from about 5 to about 49 weight percent aqueous acid. The acid may be provided as an aqueous solution such as hydrochloric acid, which is frequently marketed in concentrations of about 3.0 to about 28 volume percent in aqueous solution. The weight references herein are to the acid in the form in which it is supplied and injected. In other words, a 15 volume percent hydrochloric acid in aqueous solution would be injected in an amount equal to the stated weight percent of the aqueous solution. Similar consideration is applied to the other acids used.

The liquid $CO_2$ is pumped at temperatures typically from about −10 to about 5° F., but may be pumped at temperatures from about −15 to about 10° F. The liquid $CO_2$ may be pumped at any suitable temperature and pressure at which the $CO_2$ is liquid. In other words, at higher pressures the temperature of the liquid $CO_2$ can be higher. The liquid $CO_2$ and the aqueous acid are physically mixed at the wellhead or at the pump discharge or the like. The liquid $CO_2$ is quite soluble in the acids and they form a microemulsion that has a viscosity of about 20 to about 90 centipoises and a lower relative permeability than plain acid. Testing has indicated that plain acid has a relative permeability of about 4 millidarcy (md), while the $CO_2$ foamed acid had a relative permeability of 0.3 md for the acid component (a decrease of over 13 times or 1300%) while the relative permeability to the $CO_2$ component was 0.2 md (a decrease of 20 times or 2000%) depending upon the amount of liquid $CO_2$ used. The much lower relative permeability, and conversely higher viscosity, are critical in reducing acid leak-off near the wellbore and thereby causing the formation of a main flow channel for the acid to penetrate deeper into the formation than non-foamed and/or low viscosity acids.

Generally speaking higher concentrations of liquid $CO_2$ result in a higher viscosity. This higher viscosity in the liquid $CO_2$/treating liquid microemulsion acts as a fluid loss agent preventing leak off of the acid from the near wellbore. The injection mixture forms one or more main flow channels (worm holes) in the formation so that the microemulsion is pushed deeper into the formation by the injection of lesser volumes than by the injection of the acid or other material alone. The microemulsion is forced deeper into the formation and reaches the areas of the reservoir which have not been previously produced or depleted. Once the microemulsion is in place, it tends to release the acid or other treating material into the subterranean formation for its interaction with the formation.

Desirably the acid optionally contains a foaming agent, which may be any suitable foaming agent compatible with the subterranean formation and the acid. For instance, some suitable foaming agents are shown in U.S. Pat. No. 4,737,296 issued Apr. 12, 1998 to David R. Watkins. The foaming agent may comprise a surfactant system as disclosed in U.S. Pat. No. 4,650,000 issued Mar., 17, 1987 to Eva M. Andreasson, et al. Additional foaming agents for foaming and stabilizing acidizing fluids are disclosed in U.S. Pat. No. 6,555,505 issued Apr. 29, 2003 to Karen L. King, et al. These patents are hereby incorporated in their entirety by reference.

As indicated previously, substantially any suitable foaming agent compatible with the liquid $CO_2$ and the treating fluid is effective.

Further it is desirable that the acid contains quantities of methanol. While the presence of methanol is optional, it is desired that the methanol be present in an amount from about 5 to about 25 weight percent in the preferred composition.

The composition of the present invention can be used to inject acid, organic solvents, scale inhibitors or corrosion inhibitors into the formation. While acidizing is a commonly used treatment which is greatly improved by the process and composition of the present invention, it is noted that in some instances it is desirable to inject organic solvents into a subterranean formation to remove materials such as, for instance, asphaltenes deposited near a production wellbore or at production sites within the formation at which hydrocarbons are released into a permeable flow path into a wellbore or the like. Similarly, scale inhibitors are frequently injected for a substantial distance into the formation to inhibit the formation of scale as water, oil or gas components are released from the formation with the resulting formation of scale in the pores from which they are released and through which they pass. It is quite commonly necessary to inject a scale inhibitor to maintain production in a subterranean formation. Such scale inhibitor injections may be made after an acid treatment to remove scale or the like, as known to those skilled in the art. Further, corrosion inhibitors may desirably be injected to inhibit corrosion of well components as fluids are produced through such well components. In other words, the injection of the corrosion inhibitors a substantial distance into the formation results in the production of the corrosion inhibitor in trace quantities (which may be sufficient to inhibit corrosion in the well equipment) with the produced fluids The method of the present invention comprises forming the composition and injecting it into the subterranean formation and thereafter shutting in the well for at least one hour.

As discussed previously, the microemulsion has much lower interfacial tension and a higher viscosity than the acid without the addition of the liquid $CO_2$. These two qualities combine to give the microemulsion the ability to penetrate deeply into the subterranean formation. The mixture is pumped into the well at pressures adequate to inject it into the formation. The quantity injected will be determined by the pore volume which it is desired to treat. Particularly when acids are injected but in general with all the materials, the treating materials will have an interaction with the formation rock to dissolve, clean, treat or otherwise modify the rock's ability to produce oil, gas, water or the like. The mixture is pumped into the well at pressures below fracturing pressure, but adequate to inject it into the formation as noted and in a volume sufficient to treat the volume of the well which is desired to be treated. If it is desired to push the composition deeply into the well, a slug containing from 0 to about 100 weight percent liquid $CO_2$ and from about 0 to about 100 weight percent water or crude oil may be used for injection into the well to push the composition further into the formation. Desirably once the composition is in place, it is left in place for a period of time to absorb heat from the formation and generate foam. The foam then moves out into formation portions which have not previously been treated. Desirably the composition is left in place in the formation for at least one hour and preferably up to 4 hours or longer.

With the formation shut in, the foam is pushed into areas of the formation which have not previously been treated from the flow path created by the injection of the composition by the increased pressure in the well.

Placing the composition in the subterranean formation, as discussed above, when corrosion inhibitors or scale inhibitors are used, results in positioning these materials in the formation so that they can be produced back with the materials produced from the formation to inhibit corrosion of well tubulars, which include rods, tubing, casing, packers, bridge plugs and subsurface pumping equipment and the like. Similarly, the use of scale inhibitors not only inhibits scale formation in the formation but also on the components of the well.

The composition of the present invention comprises from about 51 to about 95 weight percent liquid $CO_2$ and from about 5 to about 49 weight percent of a treating fluid. The treating fluid, as indicated previously, may be an aqueous acid, an inorganic solvent, a scale inhibitor or a corrosion inhibitor, or any other desired treating fluid or mixtures thereof. The present method and composition are directed to a carrier composition which is useful to carry treating fluids into a subterranean formation more efficiently and more effectively than has been previously possible.

Desirably the composition contains from about 60 to about 80 weight percent $CO_2$ in the composition. As indicated, increased quantities of liquid $CO_2$ result in increased viscosity and more effective movement in a slug fashion through the formation.

Desirably in the composition, the treating liquid is at least one of an inorganic acid, an organic acid, an organic solvent, a scale inhibitor or a corrosion inhibitor or the like. Typically the acid is selected from the group consisting of hydrochloric, perchloric, nitric, sulfuric, phosphoric, hydrobromic, hydrofluoric, hydriodic, citric, acetic and combinations thereof. Further the composition also desirably contains from about 5 to about 25 weight percent methanol and from about 0.2 to about 1.0 weight percent of a foaming agent. The composition typically has a viscosity from about 20 to about 90 centipoise and preferably from about 60 to about 90 centipoise.

EXPERIMENTAL PROCEDURES

Formation samples were extracted of hydrocarbons, leached of salts and dried until the weight stabilized. Basic properties, including grain density, pore volume and permeability to air were measured at 1400 psi net confining stress.

Synthetic formation brine was prepared based on the analysis of the formation brine using deionized water and reagent grade chemicals. The synthetic formation brine was filtered to 0.45 microns and degassed. Fluid parameters including viscosity and density were measured at 135° F.

Samples were evacuated of air and pressure saturated with synthetic formation brine. Saturation percent was calculated gravimetrically.

Each sample was loaded into a centrifuge in an air-displacing-brine configuration. The samples were desaturated at a capillary pressure equivalent to 200 psi. Initial water saturation was calculated gravimetrically.

Each sample was briefly saturated with depolarized kerosene.

Each sample was loaded into a hydrostatic coreholder and 1400 psi net confining stress was applied. A pore pressure of 200 psi was established by passing depolarized kerosene through the system and around the sample. Coreholder, sample and system were elevated to 135° F. while maintaining net confining stress and pore pressure and allowed to equilibrate for four (4) hours.

Crude oil was injected through each sample at a constant rate to displace the depolarized kerosene. Once the depolarized kerosene was displaced and the differential pressure stabilized, effective permeability to oil at initial water saturation was determined.

The temperature was reduced to ambient while bypassing crude oil through the system and around the sample. The pore pressure was slowly removed and each sample was unloaded from the coreholder.

Each sample was loaded into an aging vessel, covered with crude oil and pressurized to 500 psi. The samples were allowed to age for one week at 135° F. while temperature and pressure were monitored. After wetability restoration, the vessel was cooled to ambient temperature and the pressure was slowly lowered. Each sample was removed for flow testing.

Each sample was loaded into a hydrostatic coreholder and 1400 psi net confining stress was applied. A pore pressure of 3800 psi was established by passing depolarized kerosene through a system and around the sample while maintaining 1400 psi net confiding stress. Coreholder, sample and system were elevated to 135° F. while maintaining net confining stress and pore pressure and allowed to equilibrate for four (4) hours.

Synthetic formation brine was injected through each sample at a constant rate, while collecting produced volumes of water and oil and monitoring differential pressure and elapsed time until a water-cut of 99.95% or greater was observed. Effective permeability to brine at residual oil saturation was determined at two injection pressures.

Figure 3:
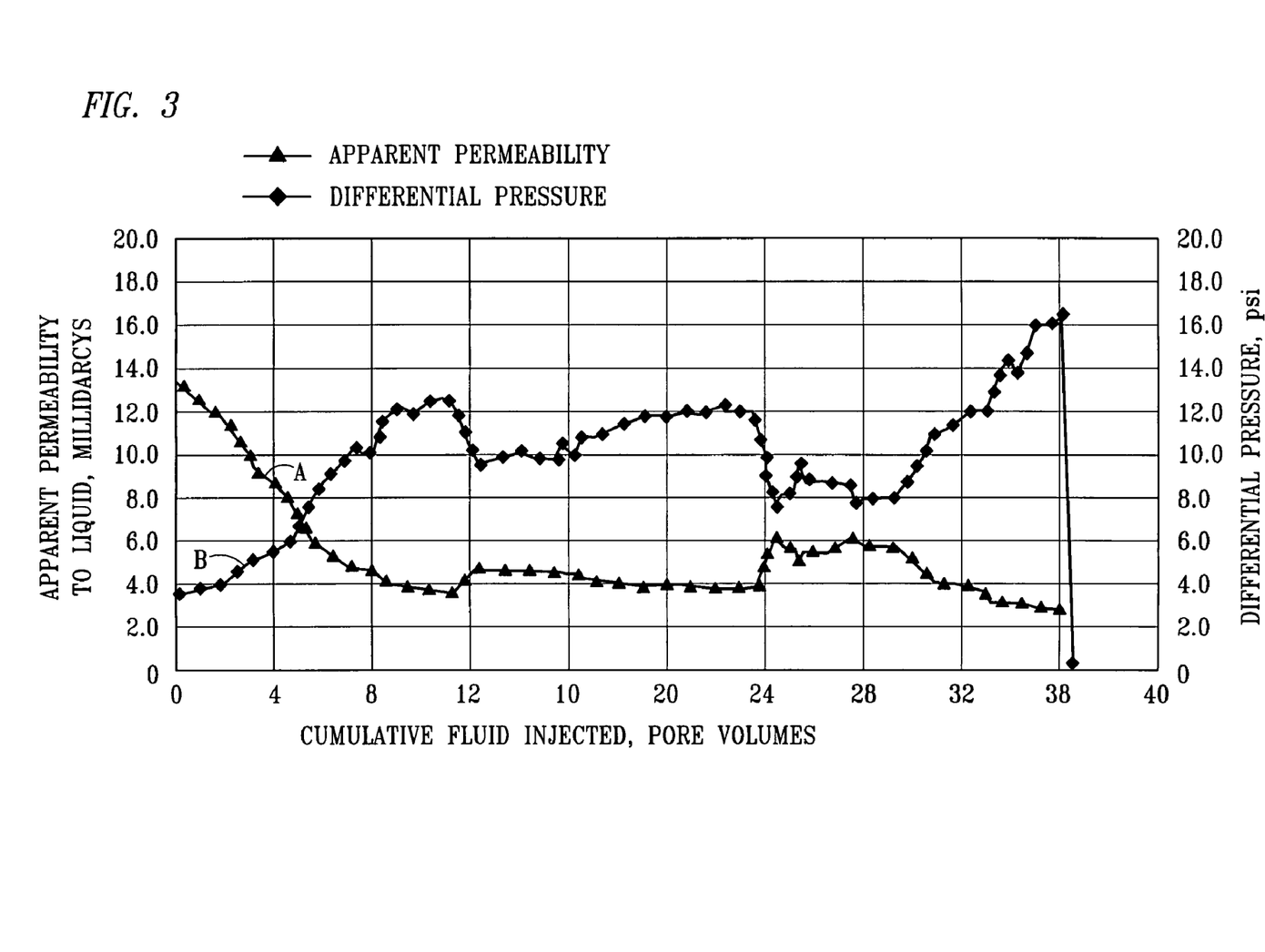
FIG. 3 is a graph showing test results from the tests described herein.

Fifteen percent hydrochloric acid and additives (sample 3C) were injected in the injection direction at a constant rate of 0.25 cc/min. Differential pressure, injected and produced volumes and injection pressure were recorded versus time. When a sudden and sharp decrease in differential pressure was noted, a worm hole had been established (FIG. 3).

Fifteen percent hydrochloric acid, additives, foamer and carbon dioxide were co-injected through a second sample (sample 3) in the injection direction at a constant rate of 0.25 cc/min. They were co-injected at an 80:20 carbon dioxide to acid ratio. Differential pressure, injected and produced volumes and injection pressure were recorded versus time. When a sudden and sharp decrease in differential pressure was noted, a worm hole had been established (FIG. 4).

The test system and sample were allowed to cool to ambient temperature. Pore pressure and net confining stress were slowly removed. Each sample was unloaded from the hydrostatic coreholder, weighed, extracted of hydrocarbons, leached of salts and dried to a constant weight.

Permeability versus throughput data was calculated based upon sample and fluid parameters and data collected using Darcy's Law. Worm hole penetration is calculated from the total amount of fluid injected versus time.

Figure 4:
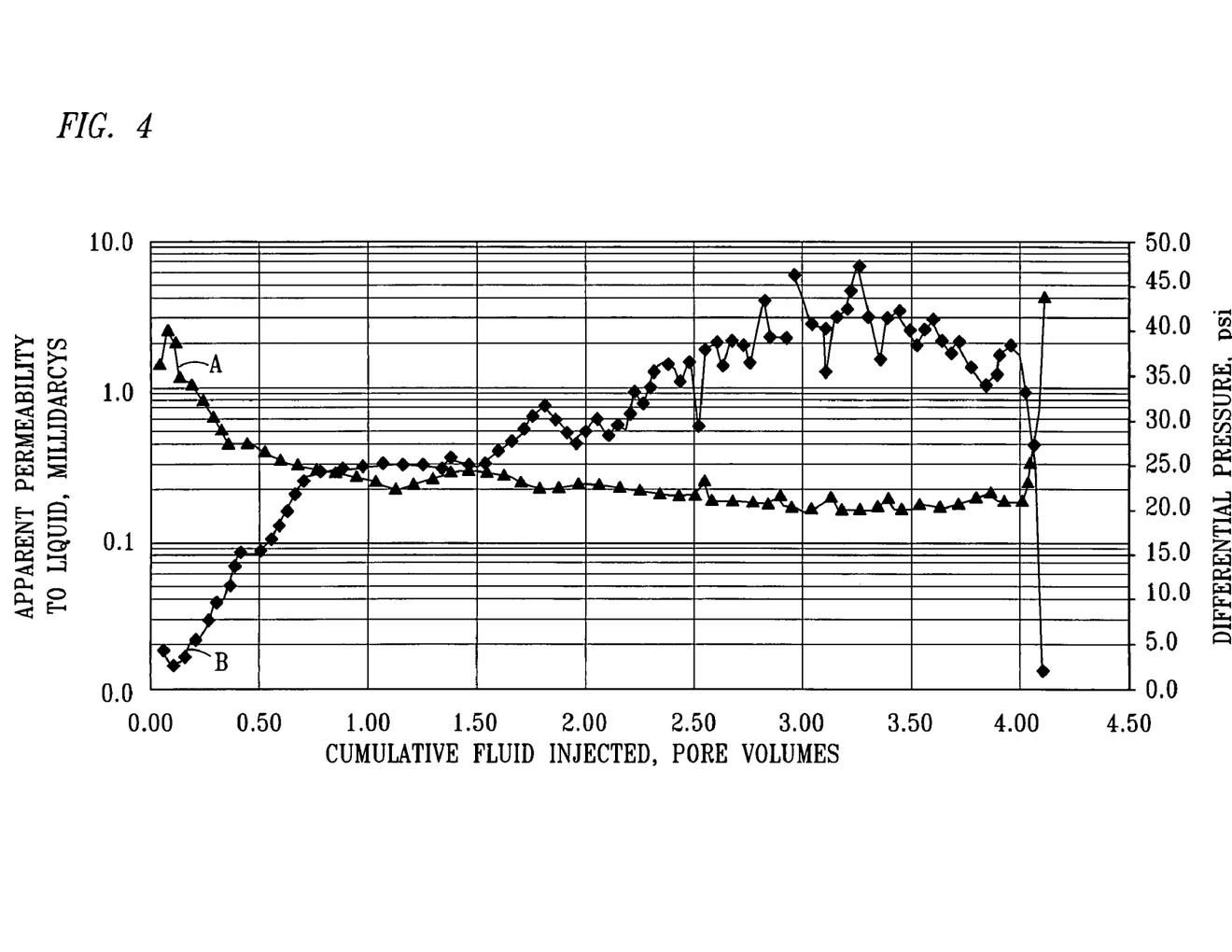
FIG. 4 is a graph showing the results achieved by the use of a conventional process, which was tested in comparison to the process for treating a formation.

By the method and by the use of the composition of the present invention as shown in FIG. 4, it will be noted that by the use of the composition of the present invention, the formation as treated has exhibited a comparable initial permeability to the tests shown in FIG. 4 with injection being at the differential pressure shown. By the injection of only four pore volumes of treating solution into the formation, the treating composition has passed through the formation leaving a treated zone in the formation from the injection point to a receiving well so that the formation is treated throughout with only four pore volumes of the composition. By direct comparison, when an aqueous acid alone is used, as shown in FIG. 3, it required 36 pore volumes of material to position the injected acid completely through the formation to a receiving well. The invention represents a significant improvement in the expense and the effectiveness of the acid to treat the subterranean formation A prior art well treating system 10 is shown in FIG. 5.

Figure 5:
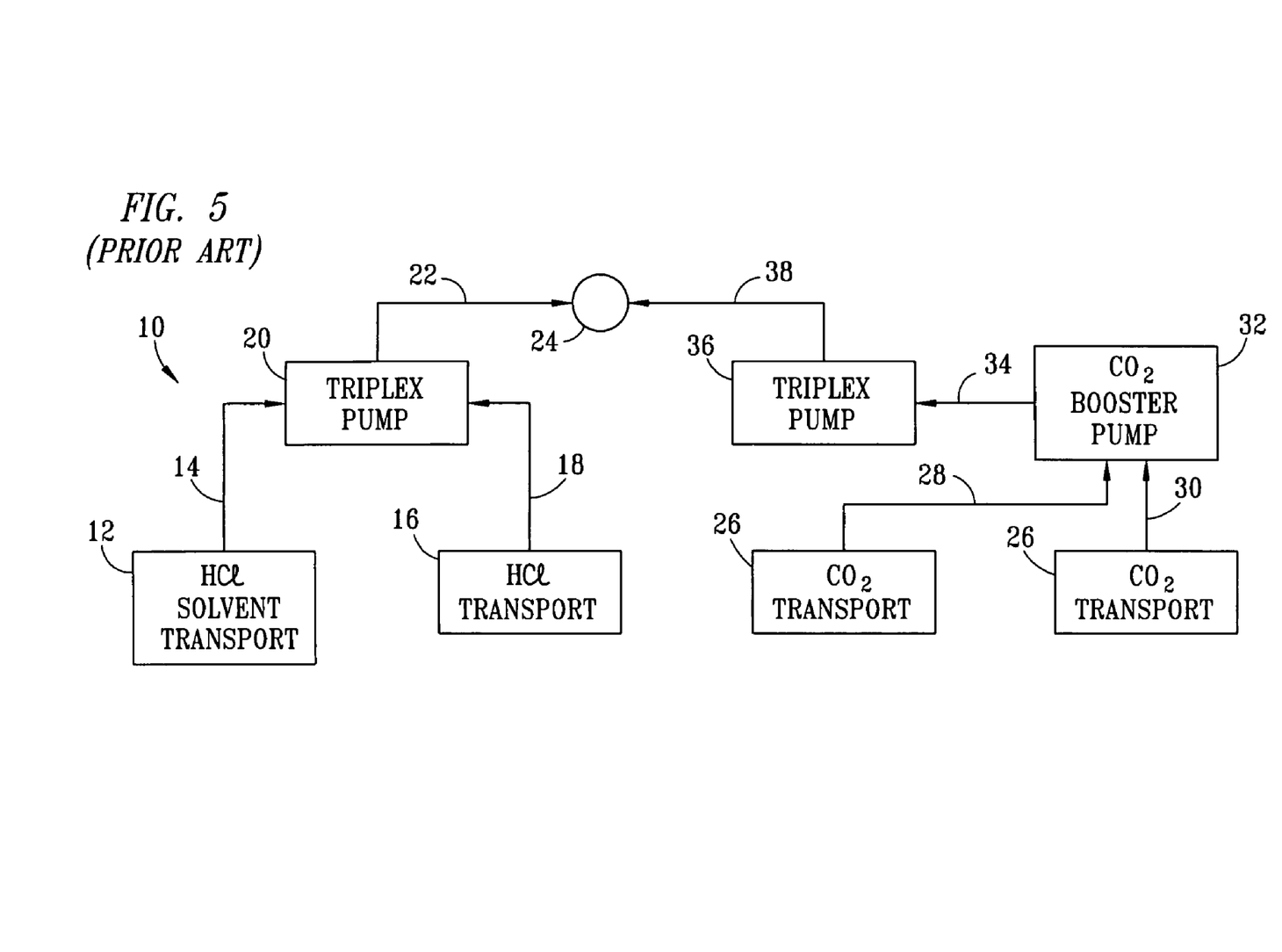
FIG. 5 shows a schematic diagram of a prior art system for injecting a mixture of a treating solution and liquid carbon dioxide.

In FIG. 5 a hydrochloric acid solution source is shown as an HCL transport 12 and a water source is shown as a water transport 16. These transports are typically large tanker trucks or the like which can be moved to a well site for treatment of the well. Typically a truck is used for the aqueous acid. Another truck is used for the liquid carbon dioxide and another and possibly more than one other truck will be used to deliver and support the pumps and their power sources. These trucks are subject to per diem charges for the time required to complete the well treatment. Typically these are trucks which discharge their cargos at a pressure from atmospheric pressure, to a booster pump (not shown) that increases the liquid pressure to about 50-150 psia as shown with water and acid solution being passed through lines 14 and 18 to a high-pressure pump 20. The high-pressure pump 20 increases the pressure of the streams to a pressure sufficient for discharge into a well 24 via a line 22.

Liquid carbon dioxide is typically delivered by trucks, shown as $CO_2$ transports 26 and is typically supplied at about 250-300 psia pressure. The carbon dioxide is typically passed to a liquid carbon dioxide booster pump 32 through one of lines 28 and 30. Booster pump 32 increases the pressure of the liquid carbon dioxide stream by about 50 to about 75 psia and passes it to a high-pressure pump 36 which increases the pressure of the carbon dioxide stream and discharges the liquid carbon dioxide stream through a line 38 to well 24. The streams are mixed in well 24 as they pass downwardly through the well.

Figure 6:
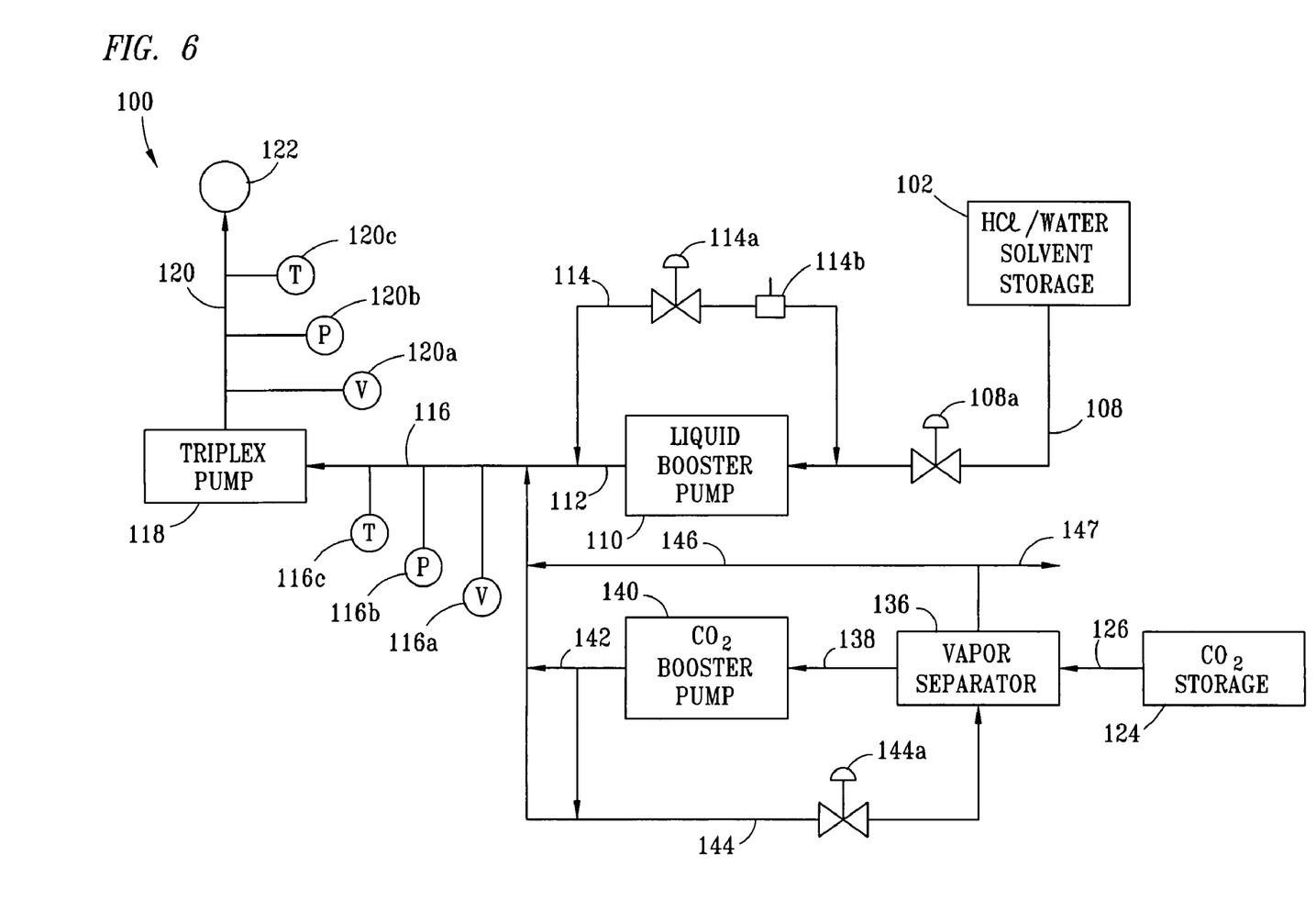
FIG. 6 is a schematic diagram of an embodiment of the present invention.

In FIG. 6 a schematic diagram of an embodiment 100 of the present invention is shown wherein an aqueous hydrochloric acid liquid is stored at atmospheric pressure. The liquid carbon dioxide is stored at 250-300 psia. In this embodiment, liquid carbon dioxide is stored in a vessel 124 and is produced through a line 126 and passed through a vapor separator 136 and then through a line 138 to a $CO_2$ booster pump 140 where it is compressed to a pressure up to about 600 psia. The stream compressed in booster pump 140 is passed through a line 142 and then through a line 116 to a high-pressure pump 118. The temperature, pressure and flowrate are measured by instruments 116a, 116b and 116c and instruments 120a, 120b and 120c for lines 116 and line 120 respectively. The high-pressure pump then increases the pressure in this stream along with the aqueous acidic liquid stream for injection through a line 120 to a well 122.

The aqueous acid liquid is stored in storage 102 and passed via a line 108 which includes a valve 108a to a liquid booster pump 110 where its pressure is increased to a pressure of about 600 psia and then combined via a line 112 with the stream from line 142 and fed to a high-pressure pump 118 via line 116. Liquid booster pump 110 also is in fluid communication with a recycle loop comprising a line 112 and a line 114, which includes a valve 144a and a vapor trap 114b; so that the output from liquid booster pump 110 can be recycled if desired in whole or in part for pressure and flow volume control.

Vapor separator 136 operates to remove accumulated vapor that has been formed by the absorption of heat as the liquid carbon dioxide has been moved from storage 124 via line 126. The vapor may be vented to the atmosphere from the top of separator 136 via a line 147, thereby preventing the booster pump 140 and high-pressure pump 118 from cavitating. In the event that the liquid $CO_2$ rate must be reduced to pump 118, a portion of the stream in line 142 can be diverted through a line 144, which includes a valve 144a, and can be re-cycled through vapor separator 136 which will remove accumulated vapor and aid in controlling liquid $CO_2$ pump 140 rate and pressure from pump 140 to high-pressure pump 116. The stream is then passed through a line 146 back to line 142 or discharged via line 147. This enables the operation of vapor separator 136 to separate vapor from the liquid carbon dioxide as required. As indicated, it is contemplated that the vapor separator will contain only relatively small volumes of carbon dioxide vapor at any given time since substantial amounts of carbon dioxide liquid are passing through these vessels.

This embodiment allows the liquid carbon dioxide to be in storage at 250-300 psia and allows for the aqueous hydrochloric acid to be in storage at atmospheric pressure. According to the present invention, the liquid treating fluid and the carbon dioxide are supplied to a single high-pressure pump at a pressure of about 550 psia, up to 650 psia, and at preferably about 600 psia. In the past it has been considered necessary to have a high-pressure pump for each of the liquid treating solution and the liquid carbon dioxide.

In the embodiment of FIG. 6 only a single high-pressure pump is used. This results in a substantial increase in the process efficiency since better emulsification is achieved. It also results in a substantial reduction of expense in that only one high-pressure pump is required to be maintained and operated on site. The resulting emulsions are formed in the high-pressure pump and the emulsion is pumped into the well at a pressure great than 650 psia.

While the invention has been discussed above by reference to aqueous hydrochloric acid as a treating solution, it should be understood that the acid solution may contain methanol and other additives. While the presence of methanol is optional it is desirable in many instances that the methanol be present in an amount from about 5 to about 25 weight percent in the treating liquid. Further the invention can be used to inject not only aqueous acid but organic solvents, hydrocarbon-based scale inhibitors, corrosion inhibitors and the like into the well alone or with the aqueous acid. The only real limitation on the use of the treating liquid is that it be liquid when mixed the liquid carbon dioxide.

As well known to those skilled in the art, whatever arrangement is used to provide the liquid carbon dioxide to the high-pressure pump at the desired pressure must maintain the liquid carbon dioxide under suitable temperature and pressure conditions to maintain it in a liquid state. Such conditions are well known to those skilled in the art.

While the embodiments shown are preferred, it is considered necessary for the practice of the present invention that the carbon dioxide be delivered in a liquid form at a pressure from about 550 psia, up to 650 psia, to the high-pressure pump along with the aqueous solution which must be delivered at the same or a comparable pressure and at a temperature which does not result in vaporization of the liquid carbon dioxide. These streams may be introduced in mixture or alone into the high-pressure pump. In either event the resulting emulsion is readily pumped by the high-pressure pump into the well as shown, for instance in FIG. 6, via line 120 into well 122.

As mentioned previously, the high-pressure pumps are typically large, positive displacement pumps having from 1 to 5 or more plungers which are relatively high maintenance and high expense pumps for use because of their ability to generate the extreme pressures used in fracturing operations and the like. These positive displacement pumps are suitable as the high-pressure pump in the present invention.

Multi-stage centrifugal pumps may be used for similar applications but are not typically used or preferred for fracturing operations. They are suitable for use as the high-pressure pump in the present invention so long as they are capable of mixing the aqueous solution and the liquid carbon dioxide and injecting the resulting mixture into a well at a pressure greater than about 650 psia.

While typical and preferred operating conditions for this embodiment have been described above, the aqueous liquid solution could be passed to the high-pressure pump at a higher or lower pressure and the higher-pressure pump is capable of compressing the mixture to pressures much higher than 650 psia. The liquid booster pumps and the feed pumps, if used, may be centrifugal pumps, multi-stage centrifugal pumps and the like as required to achieve the desired pressure increases. The operation of such pumps is much less expensive than for the high-pressure pumps and the maintenance requirements for such pumps are much lower. The preferred pressures discussed above may be varied so long as the liquid streams are mixed as liquids and so long as the carbon dioxide is passed to the high pressure pump as a liquid.

By the present invention, the use of a second high-pressure pump has been omitted and improved mixing and operational efficiency has been achieved in the delivery of the treating liquid/liquid carbon dioxide mixture into the well.

As mentioned previously, it is noted that typically both the aqueous acid or aqueous acid containing hydrocarbon-based materials or hydrocarbon materials may be delivered in a first tank truck with the liquid carbon dioxide being delivered in a second truck. Further the triplex pumps are relatively large pumps and typically are delivered and operated from a separate truck. Further the booster pumps may also be delivered by a third truck. As a result, during the length of the treatment process, all the trucks are required to remain on-site. This can result in considerable extra expense based upon the requirement for all the separate trucks required to deliver different materials to the well site. Further, additional expense will be incurred in the event the trucks are required to spend substantial time on-site while the materials are used for treatment of a well. In addition to these disadvantages the presence of this many vehicles around the vicinity of the well can impede operations and be a significant inconvenience.

Figure 7:
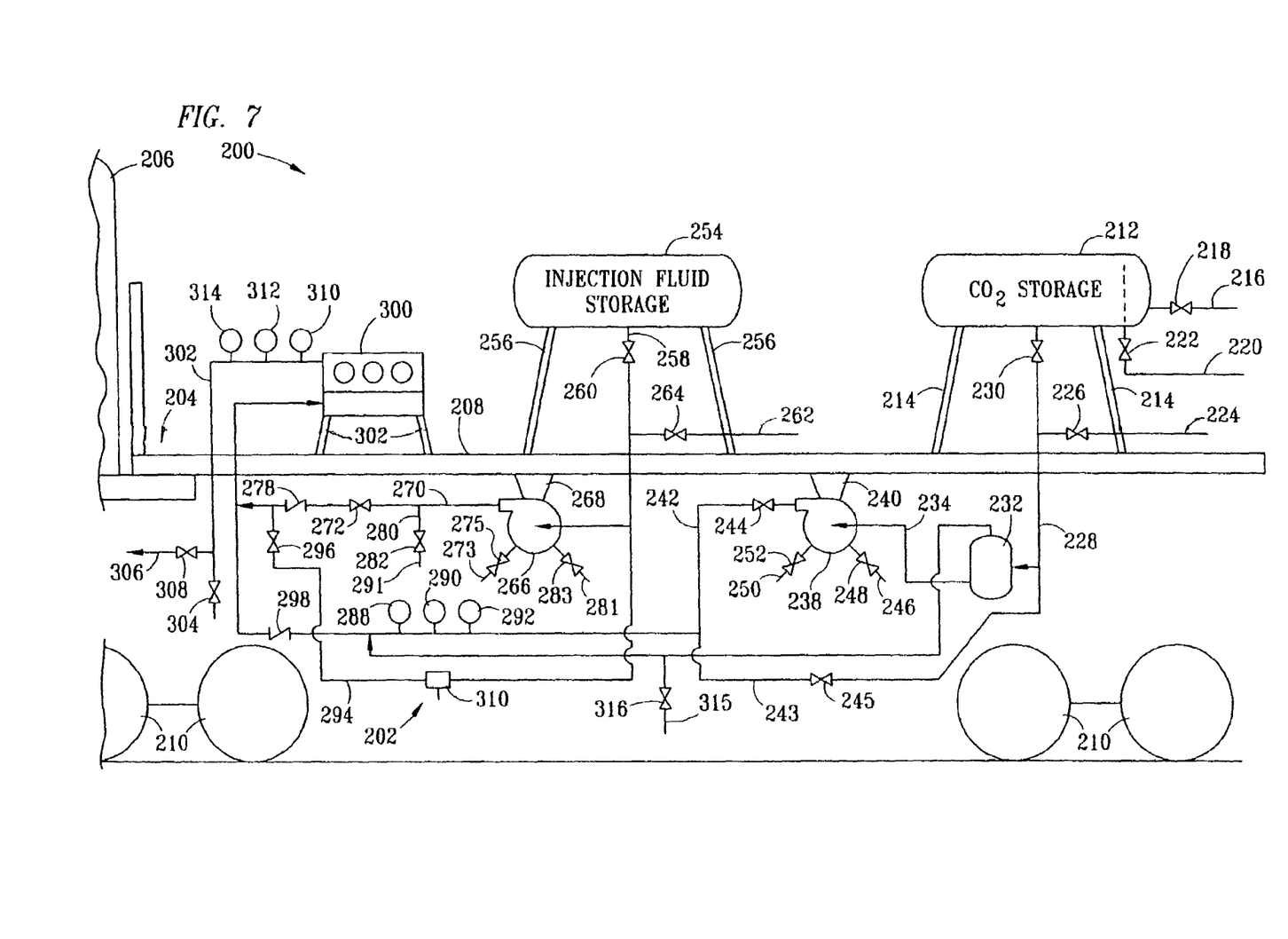
FIG. 7 is a detailed schematic diagram of an embodiment of the present invention; and, FIG. 8 is a detailed schematic diagram of an embodiment of the present invention mounted on a straight body truck.

Accordingly, a preferred embodiment is the use of a truck-mounted system for injecting a mixture of liquids into a subterranean formation via a well extending from an earth surface into the subterranean formation. Such a system is shown in FIG. 7. In FIG. 7 a truck-mounted system is shown and comprises a triplex pump positioned to receive a flow of a liquid from a first storage tank and a second stream of liquid carbon dioxide from a carbon dioxide storage tank. These materials are compressed in booster pumps to a pressure suitable for charging to the triplex pump and subsequently into the well.

FIG. 7, as shown, an injection system 200 is shown on a truck 202 which comprises a trailer 204 connected to a tractor trailer cab 206. The trailer has a bed 208 and wheels are shown schematically at 210.

Figure 8:
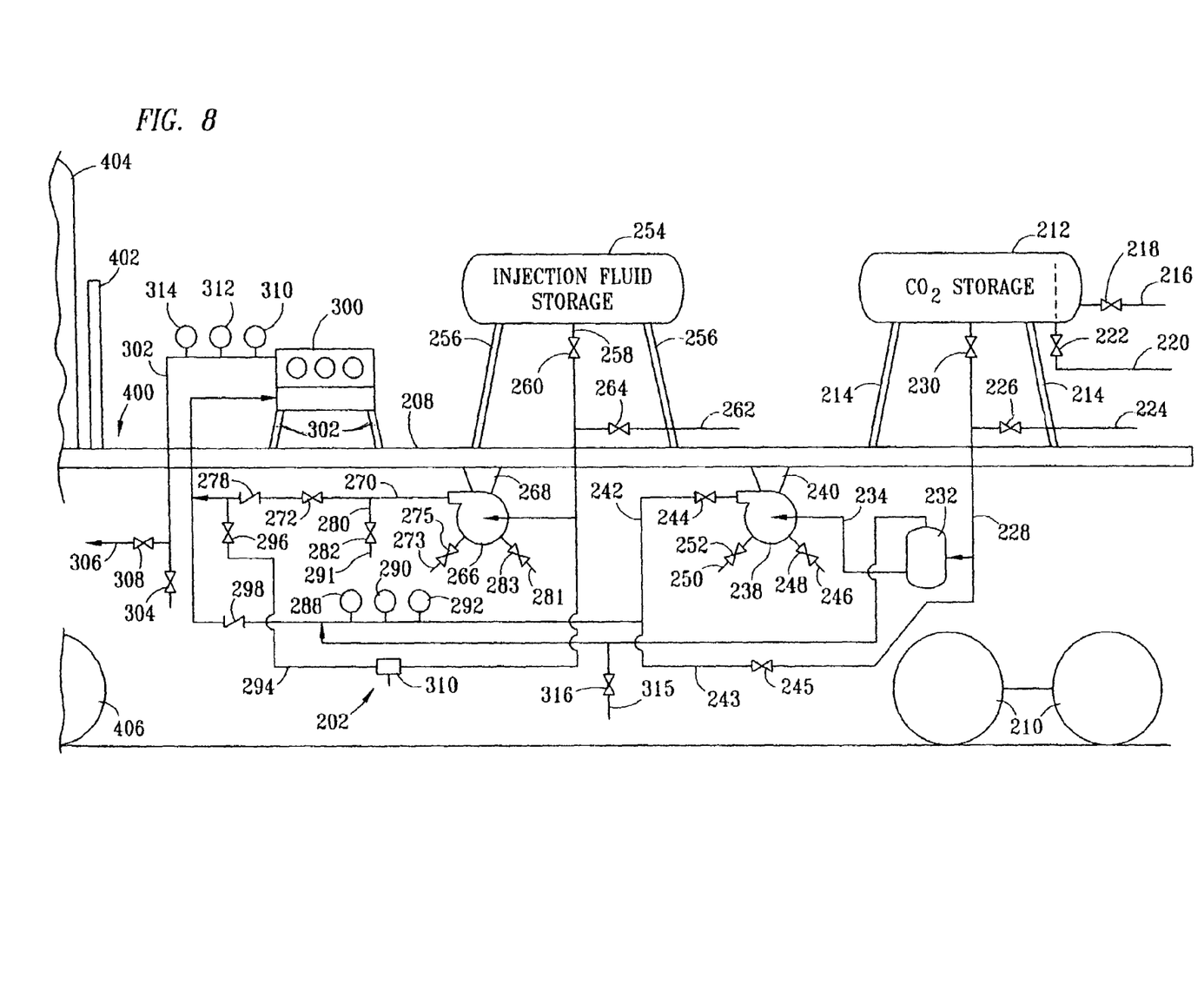

It will be understood that while a tractor trailer truck has been shown, a straight truck having a bed of a suitable size could be used as well, as shown in FIG 8. The use of such a truck enables the use of only a single truck to deliver all the required components to a well site. This reduces the congestion around the well site and reduces the per diem fees if the trucks are required to remain for extended times.

FIG. 8 includes a bed 400 supporting the equipment of the invention as described in FIG. 7, except as shown for FIG. 8. FIG. 8 includes a divider 402 on the bed 400 which separates the equipment of FIG. 7 from a cab 404 which is supported on bed 400. Bed 400 is supported by one or more pairs of wheels 406.

The system comprises a carbon dioxide storage vessel 212 wherein liquid carbon dioxide is stored. The storage vessel is supported above bed 208 by supports 214. A line 216, including a valve 218, is shown for supplying liquid carbon dioxide to tank 212. A second line 220, including a valve 222, is also provided and as shown represents a pressure relief line. Valve 222 is a pressure relief valve which reduces the pressure in vessel 212 via line 220 in the event that vessel 212 becomes over-pressured.

A line 228, including a valve 230, passes a liquid carbon dioxide stream to a vapor separator 232. This vapor separator may produce a sufficient quantity of vaporous carbon dioxide that it may be discharged to the atmosphere or it may be returned to the liquid carbon dioxide stream downstream from a pump 238. A liquid stream 234 is withdrawn from separator 232 via a line 234 and passed to pump 238 where it is compressed to a pressure up to about 600-650 psia and discharged through a line 242 including a valve 244. A vapor stream may be recovered through a line 236, a line 315 and a valve 316. Pump 238 also includes line 250, including a valve 252, and line 246, including a valve 248 for passing a supply of carbon dioxide to pump 238 from an auxiliary source of liquid carbon dioxide if necessary. In instances where an extensive well treatment may require additional liquid carbon dioxide which could be supplied by a second truck for a short term continuation of operations while the liquid carbon dioxide from the second truck is passed through pump 238 with the remaining liquid carbon dioxide being passed to carbon dioxide storage 212 or the like. Pump 238 is supported by bed 208 by support 240.

The higher pressure stream recovered from pump 238 is pumped via a line 242 through a check valve 298 and combined with a stream of aqueous acid from line 270. Temperature, pressure and volume gauges are shown at 288, 290 and 292 for monitoring the temperature and pressure in line 242.

The injection fluid, which is typically aqueous hydrochloric acid, is stored in a tank 254. It will be understood that the aqueous acid may include various materials, such as corrosion inhibitors and the like or that the injection fluid may be a hydrocarbon-based material, such as a hydrocarbon solvent and the like.

The second storage tank 254 is supported by supports 256 and liquid is discharged from tank 254 via line 258, which includes a valve 265. A line 262 is in fluid communication with line 258 via a valve 264. This line can be used to add materials to the stream in line 258 or to replenish the amount of injection fluid in tank 254. The stream flowing through line 258 is passed to a pump 266 and discharged via a line 270. Pump 262 includes a line 281 including a valve 283 and a line 273 which includes a valve 282. Either of these two lines may be used to charge material into pump 270 during operation or to either add materials to the stream from line 258 or to supply the injection fluid from an alternate source or the like. Further line 270 discharges the injection fluid stream from pump 266 at high pressure. Line 270 includes a valve 272, a line 280 including a second valve 282 and a check valve 276. The flow through line 270 goes into line 242 from pump 238 in a desired ratio as a charge stream to a triplex pump 300. Triplex pump 300 is supported by supports 303. A discharge stream at high pressure (greater than about 650 psia) is discharged from triplex pump 300 through a line 302, which includes a valve 304 to an injection well (not shown) as the injection mixture. Pressure gauge 314, temperature gauge 312 and flowmeter 310 are connected to line 302 to monitor the pressure, temperature and flow volume respectively in line 302. An alternate line 306 is in fluid communication with line 302 via a valve 308 to divert a portion of the mixture of injection fluid to a second well for other use if desired.

As shown the system includes a recycle line 294 including a valve 296 and a vapor trap 310 from line 270 downstream from pump 266 back to pump 266 to control the ratio of injection fluid and liquid $CO_2$ in line 242. A recycle line 243, including a valve 245, is shown to recycle liquid $CO_2$ from line 242 to vapor separator 232. A vapor line from vapor separator 232 passes vapor to line 242 downstream of pump 238 or through a line 315 including a valve 316 to discharge.

It will be appreciated that while the lines are shown as closely spaced in FIG. 7, it will be unnecessary to space lines as closely in practice since the lines can be spaced across the width of bed 204 whereas they must be shown in two dimensions in the drawings.

By the use of this system, the injection fluids (liquid carbon dioxide and aqueous acid, optionally including treating materials or hydrocarbon-based fluids) are supplied by a single truck used to provide pumping facilities necessary to complete the well treatment. The system is ideally suited to carry out the treatment of a subterranean formation via a wellbore by the use of a high pressure liquid stream containing a mixture of liquid carbon dioxide and a liquid injection fluid. The apparatus, as shown mounted on a truck, avoids the need for retaining more than one truck at the injection site and includes facilities for refilling the liquid carbon dioxide tank and the treating fluid tank from other trucks which may be brought to the site if necessary to fill the tanks after a first treatment for a second treatment of another well which may be in the vicinity or the like. Further, the truck includes all the pumping capacity needed to provide the mixed liquid treatment for injection into the well at the conditions required for injection. This represents a significant advantage in reducing the cost of the treatment, in retaining the flexibility to use materials from separate sources and provide pumping capacity at the facility even if additional sources are supplied are of one type of fluid or another are required. Further the congestion around the wellbore and the expense for demurrage and the like has been eliminated by this system.

Further the engine of the truck can supply the energy required to drive the pumps, thereby removing the need to haul an expensive and bulky power unit to the well. Many advantages are achieved by the use of the truck-mounted system.

While the present invention has been described by reference to certain of its preferred embodiments, it is pointed out that the embodiments described are illustrative rather than limiting in nature and that many variations and modifications are possible within the scope of the present invention. Many such variations and modifications may be considered obvious and desirable by those skilled in the art based upon a review of the foregoing description of preferred embodiments.

What is claimed is:

1. A truck-mounted system for injecting a mixture of liquids into a subterranean formation via a well extending from an earth surface into the subterranean formation, the system comprising:
    a) a truck having a bed and being adapted to support the system and transport the system for use to inject the mixture of liquids via the well into the subterranean formation;
    b) a first tank positioned on the bed, adapted to contain a quantity of a first liquid and adapted to supply selected quantities of the first liquid to the well;
    c) a second tank positioned on the bed, adapted to contain a quantity of a second liquid and adapted to supply selected quantities of the second liquid to the well;
    d) a first pump supported by the bed in fluid communication with the first tank and adapted to pump selected quantities of the first liquid to a selected pressure;
    e) a second pump supported by the bed in fluid communication with the second tank and adapted to pump selected quantities of the second liquid to a selected pressure; and,
    f) a third pump supported by the truck bed, in fluid communication with the first pump and the second pump and adapted to pump the mixture of liqiuids into the well at a pressure higher than the selected pressure.

2. The system of claim 1 wherein the first liquid is liquid carbon dioxide.

3. The system of claim 1 wherein the second liquid is an aqueous acid.

4. The system of claim 1 wherein the truck is a tractor and trailer truck.

5. The system of claim 1 wherein the truck is a straight body truck.

6. The system of claim 1 wherein a recycle line including a valve is positioned in fluid communication with a liquid discharge line from the first pump and a vapor separator.

7. The system of claim 1 wherein a vapor separator is positioned in a line from the first tank to the first pump.

8. The system of claim 1 wherein the system includes a recycle line including a valve and a vapor trap positioned in fluid communication with a liquid discharge line from the second pump and a liquid inlet line to the first pump.

9. The system of claim 1 wherein the third pump is a triplex pump.

10. The system of claim 9 wherein the truck includes an engine adapted to power the triplex pump.

11. The system of claim 10 wherein the truck engine is adapted to power at least one of the first pump and the second pump.

12. The system of claim 1 wherein a discharge stream from the third pump into the well includes the first liquid and the second liquid in a selected ratio in the mixture of liquids.

13. The system of claim 1 wherein at least one of the first pump and the second pump is supported by the truck bed in a position beneath the truck bed.

14. The system of claim 1 wherein the first pump is adapted to pump the first liquid to a pressure from about 550 to about 650 psia.

15. The system of claim 1 wherein the second pump is adapted to pump the second liquid to a pressure from about 550 to about 650 psia.

16. The system of claim 1 wherein the third pump is adapted to pump the mixture of liquids into the well at pressures greater than 650 psia.

17. The system of claim 1 wherein the first pump and the second pump are centrifugal pumps or multistage centrifugal pumps.

* * * * *